W. H. WOODWARD.
ROTARY INTERNAL COMBUSTION ENGINE.
APPLICATION FILED FEB. 10, 1919.

1,353,205.

Patented Sept. 21, 1920.
6 SHEETS—SHEET 3.

INVENTOR
William H. Woodward
BY
John A. Bommhardt
ATTORNEY

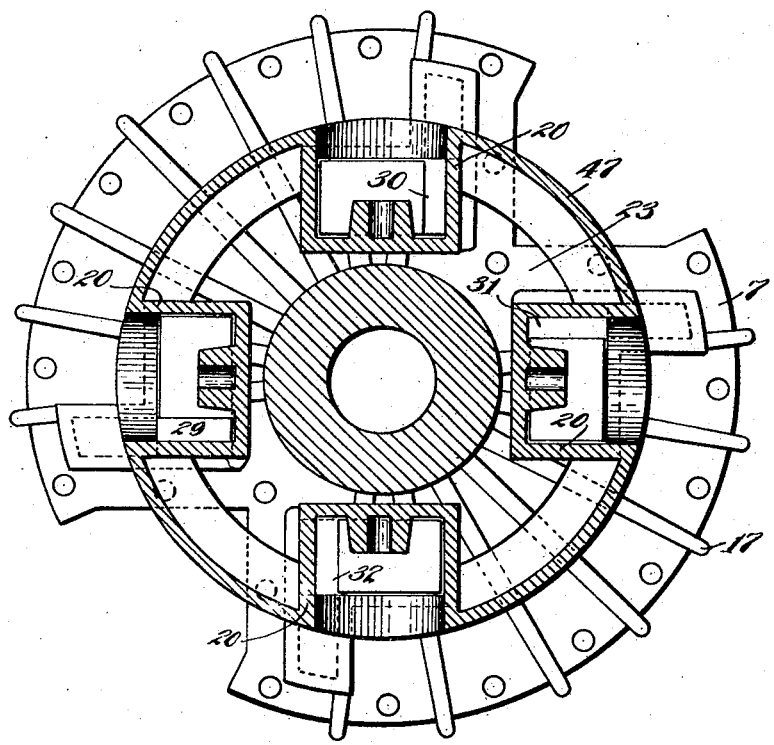

W. H. WOODWARD.
ROTARY INTERNAL COMBUSTION ENGINE.
APPLICATION FILED FEB. 10, 1919.

1,353,205.

Patented Sept. 21, 1920.
6 SHEETS—SHEET 5.

INVENTOR
William H. Woodward
BY
John A. Bommhardt
ATTORNEY

W. H. WOODWARD.
ROTARY INTERNAL COMBUSTION ENGINE.
APPLICATION FILED FEB. 10, 1919.

1,353,205. Patented Sept. 21, 1920.
6 SHEETS—SHEET 6.

INVENTOR
William H. Woodward
BY
John A. Bommhardt
ATTORNEY

UNITED STATES PATENT OFFICE.

WILLIAM H. WOODWARD, OF CLEVELAND, OHIO, ASSIGNOR OF TWO-FIFTHS TO LOUIS SWENINGSON AND ONE-FIFTH TO GEORGE M. POTTER, BOTH OF CLEVELAND, OHIO.

ROTARY INTERNAL-COMBUSTION ENGINE.

1,353,205.  Specification of Letters Patent.  Patented Sept. 21, 1920.

Application filed February 10, 1919. Serial No. 276,012.

*To all whom it may concern:*

Be it known that I, WILLIAM H. WOODWARD, a citizen of the United States, residing at Cleveland, in the county of Cuyahoga and State of Ohio, have invented certain new and useful Improvements in Rotary Internal-Combustion Engines, of which the following is a specification.

This invention relates to improvements in rotary engines of the internal combustion type, and has for its object to provide an engine of the above type which will be very powerful in proportion to its size and weight, and contain few moving parts so arranged as to cheapen its construction while greatly adding to its efficiency.

A further object of my invention is to provide an engine of the type specified, containing a minimum of moving parts which do no require adjustment, making it a desirable engine when in use in unskilled hands; and providing an engine that may be used wherever engines of this type are required especially where space is limited or in air craft where light engines and high power are essential.

A still further object of my invention is to provide an engine of the above type, which operates on the four cycle principle without the use of valves, but so arranged as to cause its cylinder ports to pass over exhaust and inlet chambers respectively, which allows said cylinders or compartments to remain in communication with said exhaust and inlet chambers for a longer period in relation to their degree of travel than is usually found in internal combustion engines, insuring a more thorough scavenging of cylinders, and will, by gradually opening after each charge has expanded, produce a quiet running engine.

A still further object of my invention is to produce an engine of the type specified, which owing to its large number of impulses per revolution will not only run smoothly but will give it a broad range of speed, and the large number of pulsations plus the rotating action of the engine also enables me to dispense with the use of a fly wheel.

A still further object of my invention is to produce an engine of the above type with novel means for cooling, and my invention further consists in certain other novel details of construction and in combinations of parts, all of which will be first fully described and afterward specifically pointed out in the appended claims.

In the accompanying drawings a preferred embodiment of my invention is illustrated, but it will be understood that various changes and modifications may be made, as to the details of the construction and arrangement of the parts, without departing from the spirit of the invention;

Figure 1:
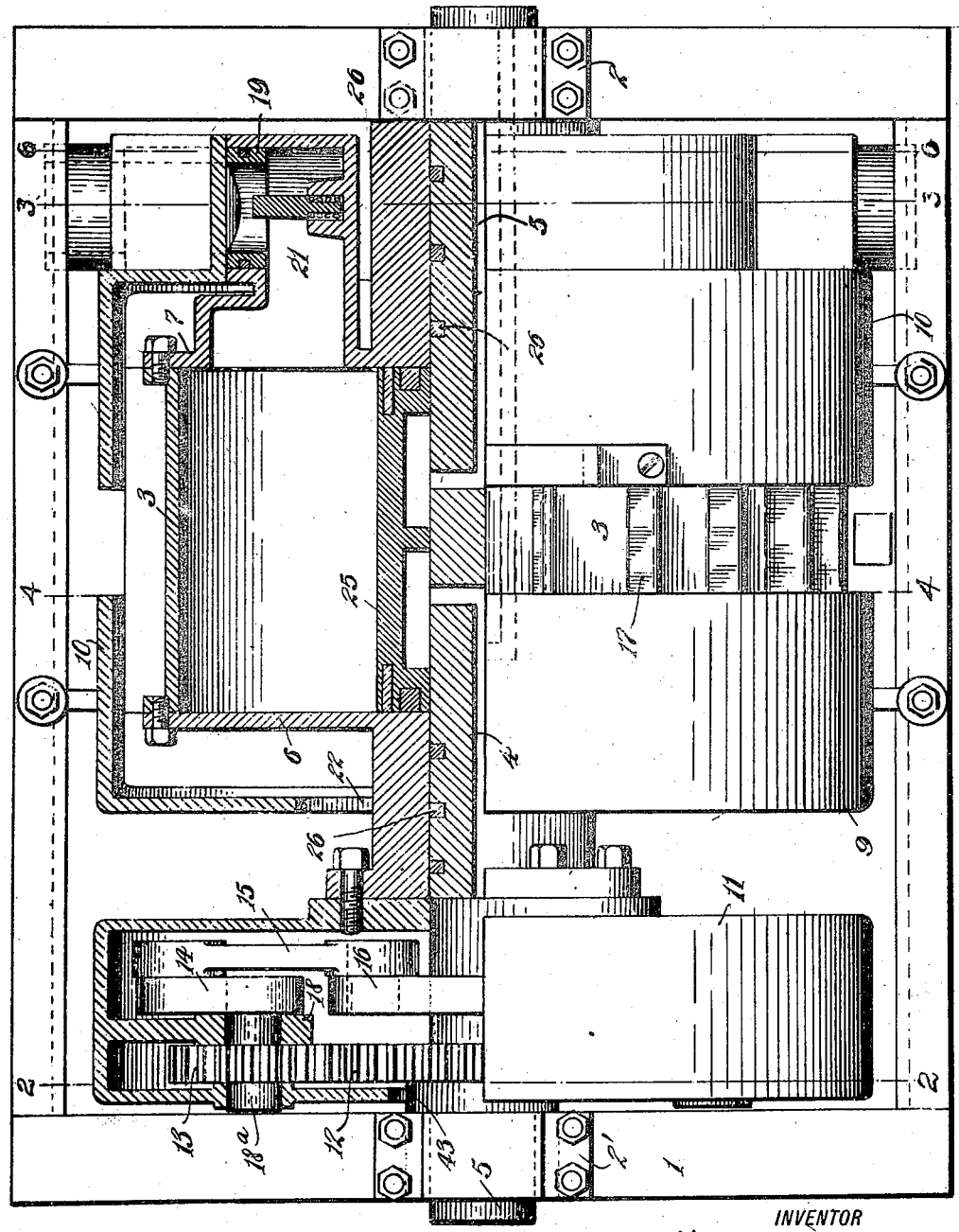
Figure 1 is a longitudinal partial sectional view of the engine on line 1—1 of Fig. 5 and line 1—1 of Fig. 6.
Figure 3:
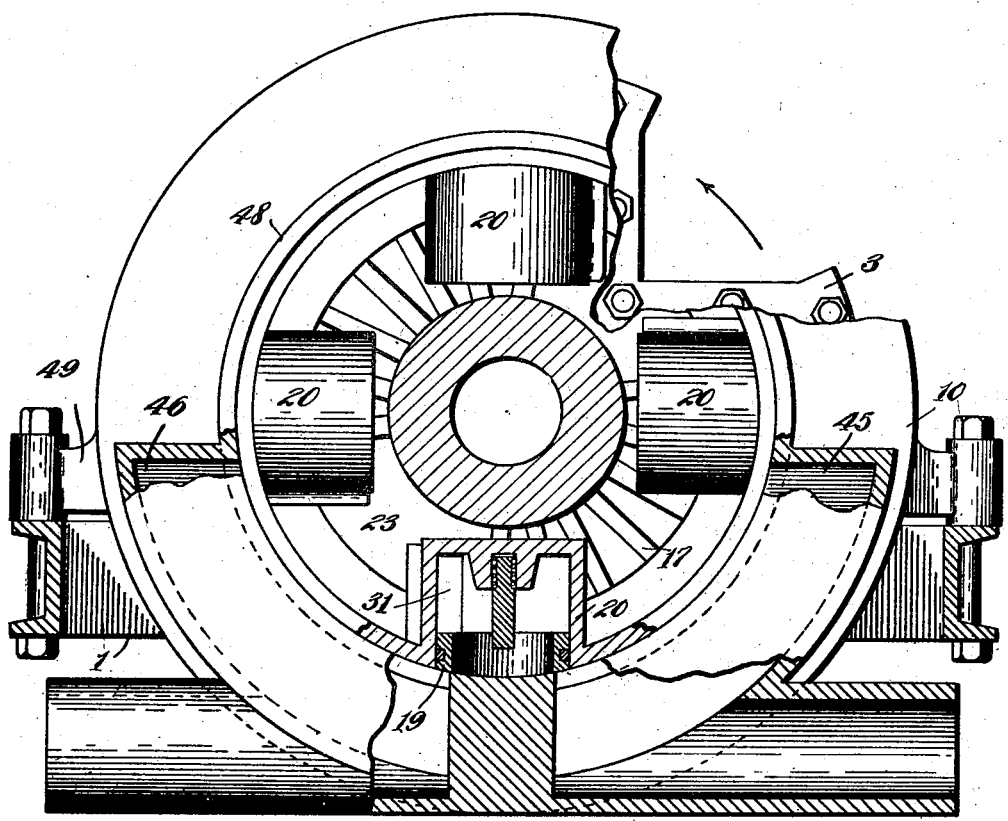

Fig. 3 is an elevation of the back end of the engine, with parts of the air case broken away to better show the cylinder, and with a pocket on back cylinder head in section on the line 3—3 of Fig. 1, and exhaust and inlet chambers in section on lines 4—4 and 6—6 of Fig. 1.

Fig. 4 is a section on line 4—4 of Fig. 1 showing pockets which connect the exhaust chamber with the cylinder compartments respectively.

Figure 5:
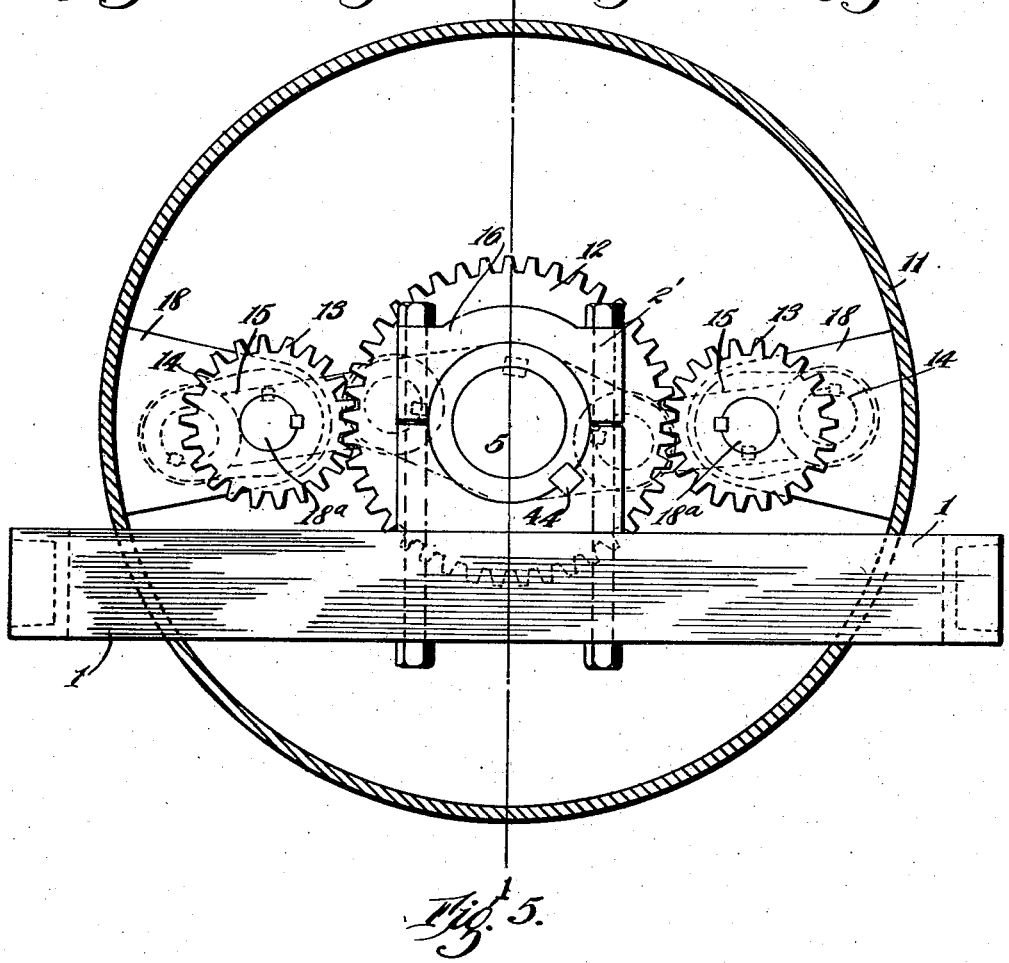

Fig. 5 is an end elevation of the crank case with the casing in section.

Figure 6:
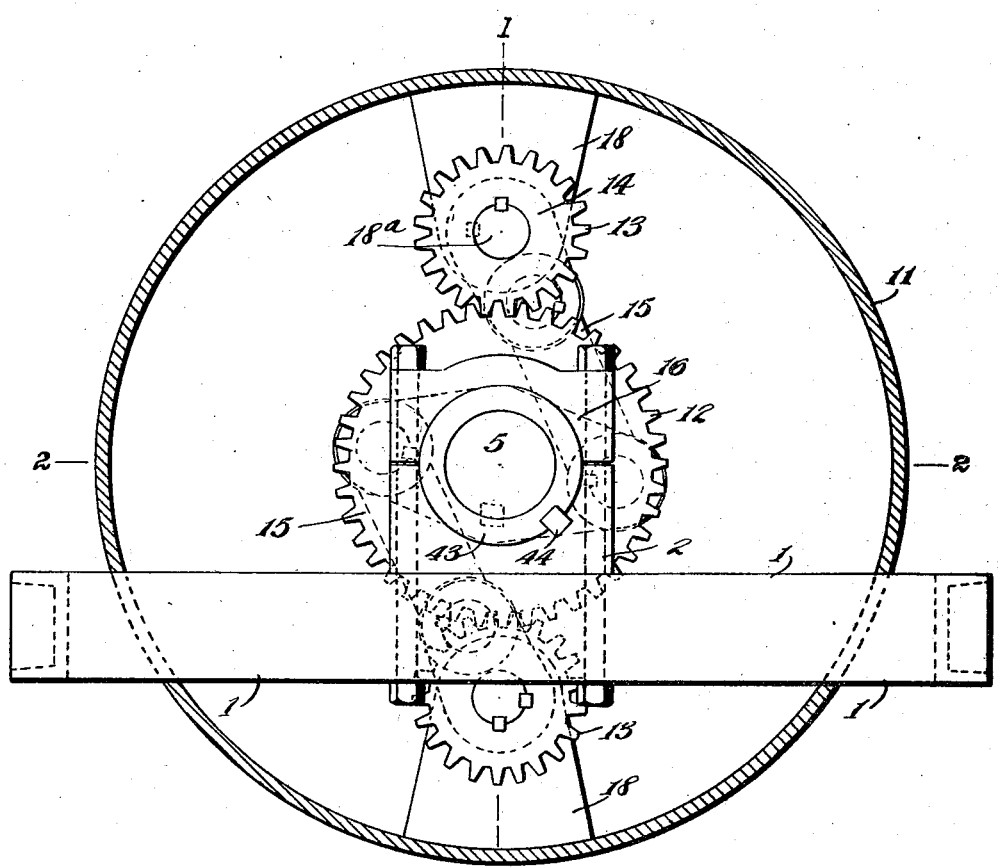

Fig. 6 is a similar elevation of the crank case with the parts in different position.

Figs. 7, 8, 9 and 10 are diagrams showing the different positions of the piston and cylinder during the course of one revolution.

In constructing my engine I employ a substantial frame 1 on which are securely mounted two bearings 2 and 2' which support a shaft 5 on which is mounted a wrist plate 16 and a two bladed piston 4, the wrist plate and piston being keyed or otherwise rigidly fixed to the shaft. A cylinder 3, with opposite heads 6 and 7, is rotatably mounted on the shaft 5. Loosely mounted on the shaft 5 on the inner side of front bearing 2' is a stationary or abutment gear 12 which has a collar 43 extending through front bearing 2', and serving as a front bearing for shaft 5, and being securely held against rotation in bearing 2' by a key 44.

The shaft 5, wrist plate 16 and piston 4 are rigid and rotate as one member, and the crank case 11, front head 6, cylinder 3 and back head 7 are all rigid with one another and in operation rotate as another member around the shaft 5.

On the inner side of crank case 11, extending toward the center, and forming part of said crank case 11, are two arms 18, each supporting a stud shaft 18$^a$ having on one end a fixed pinion 13 meshing with the stationary gear 12, and having on its opposite end a crank 14 which is connected to wrist plate 16 by a link 15, thus causing said plate 16, shaft 5, and piston 4 to rotate intermittently while gear case 11, cylinder 3 and its heads 6 and 7 rotate continually, forming a fly-wheel, as more fully described hereinafter.

Cylinder 3 is divided by partitions or abutments 8 and piston hub 25 into two compartments which are intersected by the double winged piston 4 into two more compartments which are closed at the ends by cylinder heads 6 and 7 and form four compartments A, B, C and D, each of which, owing to the pinions 13 being one half the size of the stationary or abutment gear 12, will fire at each revolution of the engine, that is, each compartment will take gas, compress it, fire it, use its expansion, and discharge once every revolution, which with four compartments gives four impulses during each revolution.

Figure 2:
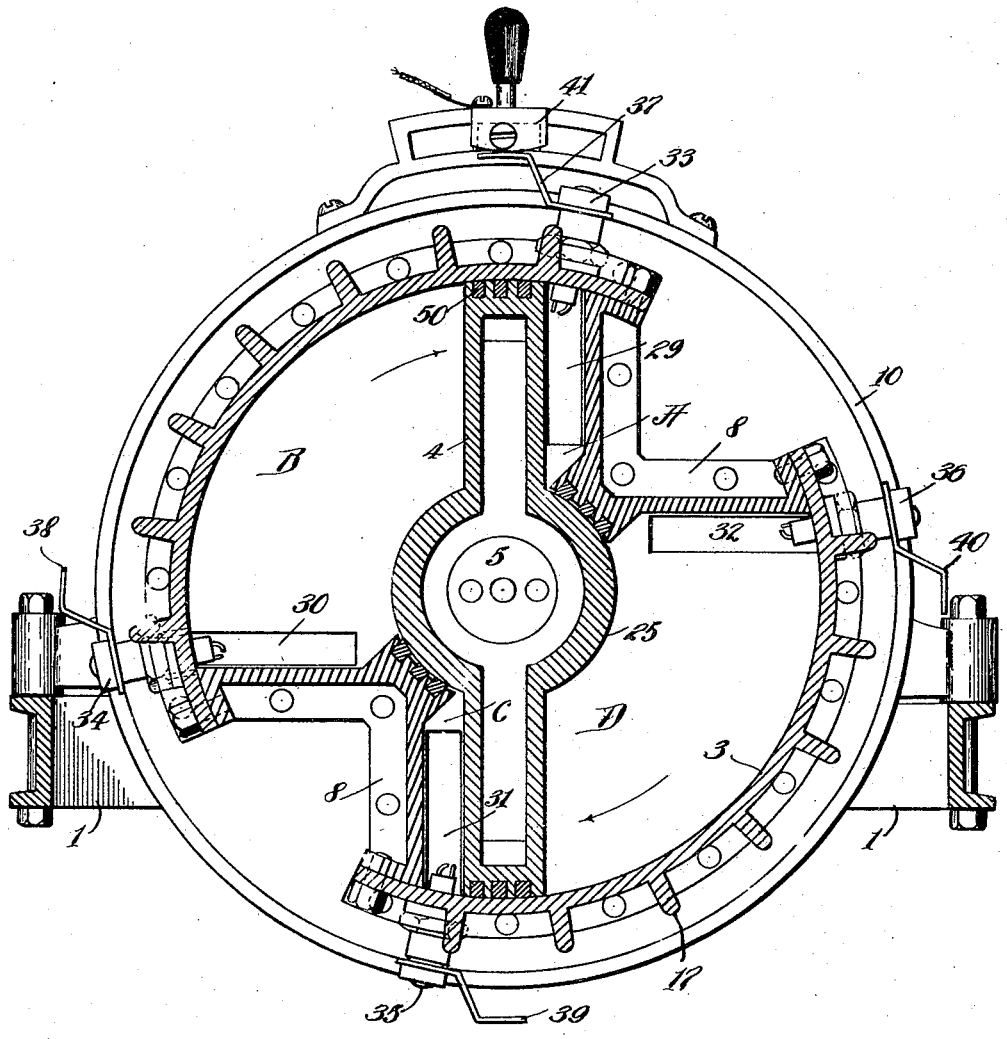
Fig. 2 is a cross section of the engine on line 2—2 of Fig. 1 and rotated to position shown in Fig. 8, showing the ignition system, and rear air case, in elevation.

The back head 7 is provided with ports (see Fig. 2) 29 from compartment A, 30 from compartment B, 31 from compartment C and 32 from compartment D, each one communicating with a separate pocket 20 which in turn pass over an exhaust passage 46 and an inlet passage 45 respectively. Pockets 20 are provided with spring packing sleeves 19 provided with packing rings 19$^r$.

Pockets 20 are cast on the inside of a ring or band 47 and the openings of said pockets form part of the face of said band 47, and as shown in Figs. 1 and 3 said pockets and ring are bridged away from the cylinder head 7 by ribs or blades 17. The ports or passages 29, 30, 31 and 32 extend lengthwise from the cylinder head and connect pockets 20 and the respective cylinder compartments, at the same time allowing a current of air to be drawn over the outer face of the head 7 and the cylinder 3 by the blades 17 for the purpose of cooling the cylinder and associated parts.

Telescoped over the ring or band 47 as shown in Figs. 1 and 3 is a stationary band 48 which supports, on less than one half of its circumference, the exhaust passage 46 and the inlet passage 45. (See Fig. 3.) The upper half of band 48 is solid or closed, while the lower half is open or slotted into the passages 45 and 46, so that when the pockets 20 are revolving in contact with said band 48 they will hold compression and expansion while passing over the closed part, and exhaust and take gas while passing over the openings to said passages.

As shown in Fig. 1 the band 48 is a part of a casing or jacket 9 which extends around the head 7 and almost to the middle of cylinder 3, and forms an air casing, and is fastened immovably to the frame 1 by arms 49. There is a similar case 10 over the opposite end of the cylinder, fastened to frame 1 in the same manner, and a circular space 24 is left as shown in Fig. 1 between the inner ends of case 9 and case 10, through which air that has been used for cooling purposes leaves the engine.

On the outer surfaces of heads 6 and 7 and cylinder 3, and forming part of same, are radial ribs or blades 17, which, when the engine is rotating, serve as a blower, taking in air at the head 6 through an opening 22, and at head 7 through opening 28, and discharging said air at opening 24, for the purpose of cooling the engine.

Ignition is effected by spark plugs 33, 34, 35 and 36, in the respective compartments A, B, C and D, said plugs carrying wiper contacts 37, 38, 39 and 40 which wipe over a contact 41 mounted on the shell 10 and which may be shifted to advance or retard the spark.

Figures 7, 8, 9, 10:
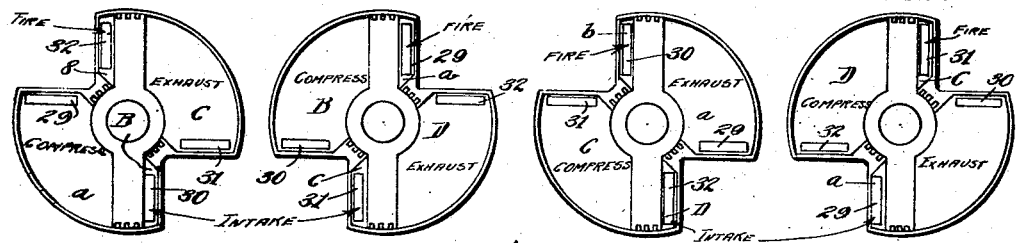

The operation of the engine is as follows:

Assuming that a charge has been compressed and is ready to fire in compartment D, with the engine parts in position as shown in Figs. 7 and 5, compartment C containing an expanded or used charge, compartment A a fresh charge ready to compress, and compartment B in position to take the gas, firing in said compartment D will rotate the piston 4 and cylinder 3 to the position shown in Fig. 8, and pinions 13 to the position shown in Fig. 6. That is, it will rotate the piston 4 one-half a revolution and cylinder 3 one-quarter revolution in clockwise direction, the cylinder forming the abutment for the impact. In the meantime the gas in compartment A will be compressed, the dead gases in compartment C will be exhausted and compartment B will have a fresh charge to compress as shown in Fig. 8. At the next ignition, in compartment A, the piston will form the abutment and the impact will take place against the cylinder partition, carrying the cylinder to the position shown in Fig. 9. When the next explosion takes place, in compartment B, as shown in Fig. 9, it will carry piston 4 around to position shown in Fig. 10 after which the next explosion takes place in compartment C and carries the cylinder around to the position shown in Fig. 7, and then the operation is repeated.

It has been made clear that cylinder 3, crank case 11 and pinions 13 rotate around shaft 5 as one member with said pinions in mesh with the stationary gear 12.

It has also been made clear that piston 4, shaft 5 and wrist plate 16 rotate as another member, and as shown in Figs. 1, 3 and 6, said plate 16, and cranks 14 of pinions 13, are connected by links 15. It has also been made clear that pinions 13 are one-half the size of stationary gear 12 so that for every revolution of crank case 11 there will be two revolutions of pinions 13 or four strokes of links 15, each stroke consisting of one-half a revolution of pinions 13 and one quarter revolution of crank case 11, so that for each half a revolution of pinions 13 or for each stroke of links 15, two compartments in the cylinder will be opened and two will be closed. Regarding the two compartments which open, one is taking gas while the other is expanding ignited gas, and regarding the two compartments which close, one is compressing gas while the other is exhausting used or dead gas. The above operation embraces one-half a revolution of pinions 13, one stroke of link 15, and one-quarter revolution of the engine proper, and is repeated to complete a revolution.

It has been made clear that each compartment opens and closes twice during one complete revolution of the engine, therefore as compartment A begins to open as cylinder port 29 begins to communicate with inlet passage 46, said compartment A takes gas during one-quarter revolution of cylinder 4 at the end of which time port 29 passes off inlet passage 45 and remains closed, and the gas in compartment A on the next one-quarter revolution is compressed and is then fired, expanding on the third quarter revolution, after which time port 29 communicates with exhaust passage 45 and remains in communication with said exhaust passage during its last quarter revolution. In similar manner compartments, B, C and D each take gas, compress it, fire it, use its expansion and exhaust it, one after the other, and each of the aforesaid compartments is fired once each revolution.

It will be apparent that when an explosion takes place in compartment D as shown in Fig. 7, with the pinions 13 and wrist-plate 16 in position as shown in Fig. 5, with cranks 14 in their outer position, piston 3 and wrist plate 16 will be rotated clockwise one-half a revolution, rotating pinion gears one half a revolution, and cylinder one quarter revolution, bringing cranks 14 to their inner position as shown in Fig. 6. On this stroke the cylinder partition 8 serves as an abutment for the explosion. The force of the explosion is just as great against said abutment 8 as it is against piston 4 but piston 4 offers no resistance and rotates away from abutment 8 at twice the speed of the cylinder thereby rotating pinions 13 around stationary gear 12 in a planetary course.

On the other stroke, or when the piston 4 forms the abutment, and the impact rotates the cylinder, the operation is as follows: Assuming that an explosion takes place in compartment A with the piston in position shown in Fig. 8 and cranks 14 on their inner position as shown in Fig. 6, it will be apparent that any pressure of the explosion tending to reverse the piston 4 will be prevented by the fact that the momentum of the engine has carried pinions 13 clockwise beyond dead center and that it is impossible to further rotate said pinion gears 13 clockwise by aforesaid impact against piston 4 in compartment A because the stationary gear 12 is immovable. In other words if cranks are on the outer position and beyond dead center clockwise it is possible to rotate the engine one quarter revolution by turning wrist plate 16 clockwise one half a revolution, but it would be impossible to reverse the piston, therefore to further rotate the engine it is necessary to turn the cylinder, as the piston will remain relatively stationary during the next quarter revolution of engine. The piston 4 is held against reversing by wrist plate 16 bearing against links 15 which in turn bear against cranks 14 which are rotated clockwise beyond dead center and which in turn are held by the teeth on pinions 13 meshing in the teeth of stationary gear 12 which in turn is held immovable in front bearing 2' by key 44.

It may be noted that pinions 13 have two positions to one of wrist plate 16, and in turning clockwise from a vertical position to a horizontal position do not materially affect the position of piston 4, but will have carried the cylinder one quarter revolution.

It may also be noted that the piston in this engine does not oscillate, but rotates one half turn at twice the speed of the cylinder and then waits for the cylinder to overtake it. In other words, on one stroke with the gears in position shown in Fig. 5 the impact or explosion will rotate the piston one half revolution, which being connected to crank 14 by links 15 will rotate the cylinder one quarter revolution to position shown in Fig. 6; at which time the piston forms an abutment by the gears being locked in mesh.

I claim:

1. In a rotary internal combustion engine, the combination of a frame, a gear fixed thereto, a rotary cylinder in the frame, having two opposite radial partitions therein, a rotary piston in the cylinder having two wings projecting oppositely between the partitions, and forming therewith four explosion chambers, a wrist plate rigid with the piston, planetary pinions carried by the cylinder in mesh with said gear, said pinions being half the diameter of the gear, a crank connected to the shaft of each pinion, and links connecting the wrist plate and the pinion cranks.

2. In a rotary internal combustion engine, the combination of a rotary cylinder having explosion chambers therein, segmental inlet and exhaust passages adjacent one end of the cylinder, and pockets carried by the cylinder and communicating with said chambers and arranged to travel over and communicate with said passages during the rotation of the cylinder.

3. In a rotary internal combustion engine, the combination of a rotary cylinder having explosion chambers therein, radial pockets carried by the cylinder and communicating at their inner ends with ports in the end of the cylinder leading to said chambers, and a ring in contact with the outer ends of said pockets, said ring having inlet and exhaust passages with which said pockets communicate during part of each revolution of the cylinder.

4. In a rotary internal combustion engine, the combination of a rotary cylinder having explosion chambers therein, radial pockets carried by the cylinder and communicating at their inner ends with ports in the end of the cylinder leading to said chambers, and a ring in contact with the outer ends of said pockets, said ring having inlet and exhaust passages with which said pockets communicate during part of each revolution of the cylinder.

5. In a rotary internal combustion engine, the combination with a rotary cylinder, of an air jacket around the cylinder, having inlet openings at opposite ends of the cylinder and an outlet opening at the middle, the cylinder having ribs adapted to force air through said opening.

6. In a rotary internal combustion engine, the combination with a rotary cylinder, of an air jacket comprising two cup-shaped sections over the ends of the cylinder, said sections having central inlet openings and being spaced apart at the middle to form an outlet opening extending around the cylinder, the cylinder having fan ribs thereon.

In testimony whereof, I do affix my signature in presence of two witnesses.

WILLIAM H. WOODWARD.

Witnesses:
 JOHN A. BOMMHARDT,
 ROBERT L. BRUCK.